(12) United States Patent  (10) Patent No.: US 7,946,370 B2
Albright et al.  (45) Date of Patent: May 24, 2011

(54) OPERATOR COMPARTMENT ASSEMBLY

(75) Inventors: Larry E. Albright, Underwood, MN (US); Gary J. Homola, Lisbon, ND (US); Maria C. Homola, legal representative, Henning, MN (US); Rodney Koch, Mooreton, ND (US); Dan A. Frederick, Forman, ND (US); Nicole L. Fuss, legal representative, Milnor, ND (US); Karla J. Frederick, legal representative, Phoenix, AZ (US); Thomas J. Roan, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 277 days.

(21) Appl. No.: 12/405,535

(22) Filed: Mar. 17, 2009

(65) Prior Publication Data

US 2010/0236857 A1  Sep. 23, 2010

(51) Int. Cl.
 *B62D 33/00* (2006.01)
(52) U.S. Cl. .......... 180/89.13; 180/89.14; 180/89.17; 296/190.05; 296/190.06; 296/190.07
(58) Field of Classification Search .......... 180/89.12, 180/89.13, 89.14, 89.15, 89.1; 296/190.05, 296/190.06, 190.07, 190.03
See application file for complete search history.

(56) References Cited

U.S. PATENT DOCUMENTS

| | | | |
|---|---|---|---|
| 3,051,259 A | | 8/1962 | Lorenz |
| 4,408,672 A | * | 10/1983 | Albright et al. ............ 180/89.14 |
| 5,551,826 A | * | 9/1996 | Todd et al. .................... 414/685 |
| 5,918,694 A | * | 7/1999 | Miller et al. ................ 180/89.14 |
| 5,941,330 A | * | 8/1999 | Miller et al. ................ 180/89.15 |
| 6,135,225 A | * | 10/2000 | Barsic ........................ 180/89.14 |
| 6,543,563 B1 | * | 4/2003 | Muraro ....................... 180/89.12 |
| 6,854,546 B2 | * | 2/2005 | Beckstrom ................. 180/89.13 |
| 6,860,707 B2 | * | 3/2005 | Roan et al. ..................... 414/723 |
| 6,910,731 B2 | * | 6/2005 | Albright et al. .......... 296/190.05 |
| 7,588,287 B2 | * | 9/2009 | Case et al. ............... 296/190.08 |
| 2005/0264038 A1 | | 12/2005 | Albright |

FOREIGN PATENT DOCUMENTS

| | | |
|---|---|---|
| EP | 0994009 A1 | 10/1998 |
| EP | 1413683 A1 | 10/2003 |
| WO | 9523725 A1 | 9/1995 |

OTHER PUBLICATIONS

Search Report and Written Opinion dated May 17, 2010 for International application No. PCT/US2010/027416, filed Mar. 16, 2010.

* cited by examiner

*Primary Examiner* — Toan C To
(74) *Attorney, Agent, or Firm* — John D. Veldhuis-Kroeze; Westman, Champlin & Kelly, P.A.

(57) ABSTRACT

A work machine includes a frame supported for movement over the ground, a prime mover for driving movement of the frame, an operator compartment supported on the frame and a cradle coupling the operator compartment to the frame. The cradle is pivotable between an operating position and a service position and includes a biasing mechanism for biasing cradle toward the service position and an isolation mount coupling the operator compartment to the cradle. The isolation mount permits deflection of the operator compartment relative to the cradle along a selected axis. A latch mechanism releasably couples the cradle to the frame and a handle is provided for actuating the latch mechanism. The isolation mount includes a deformable member having a void defining the selected axis. The axis can be aligned with a force exerted on the cradle by the operator compartment to reduce stress on the biasing member.

19 Claims, 6 Drawing Sheets

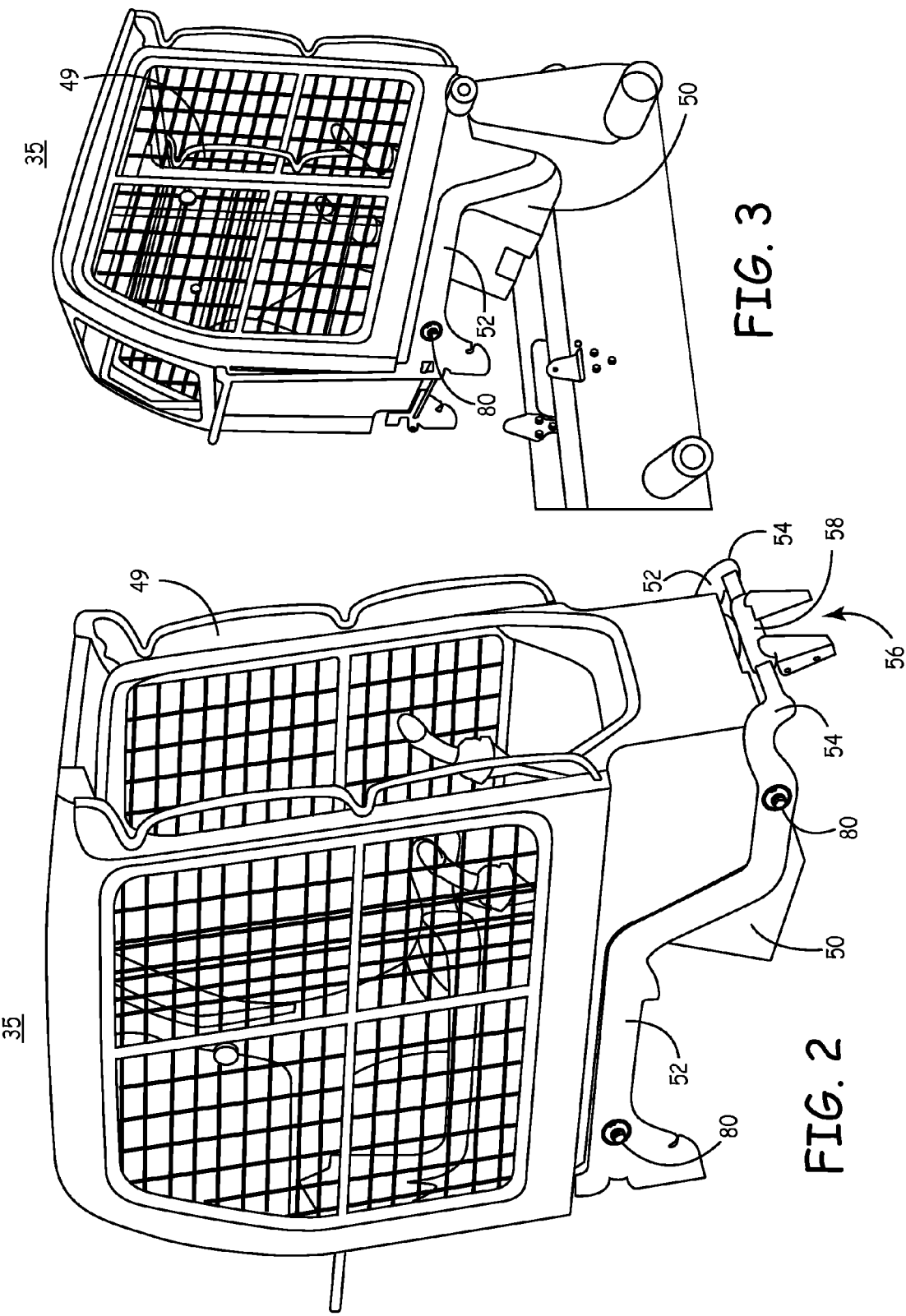

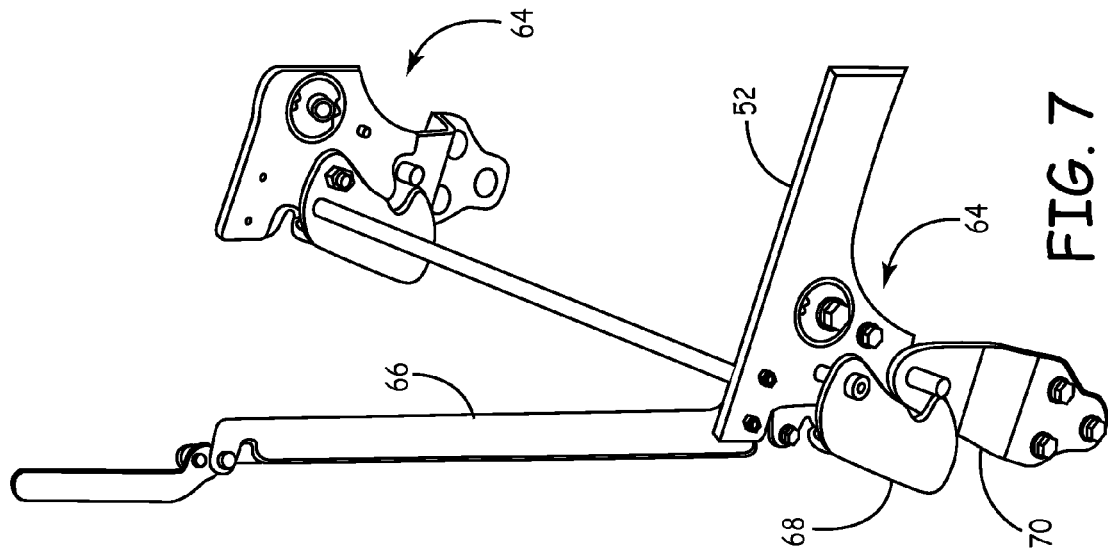
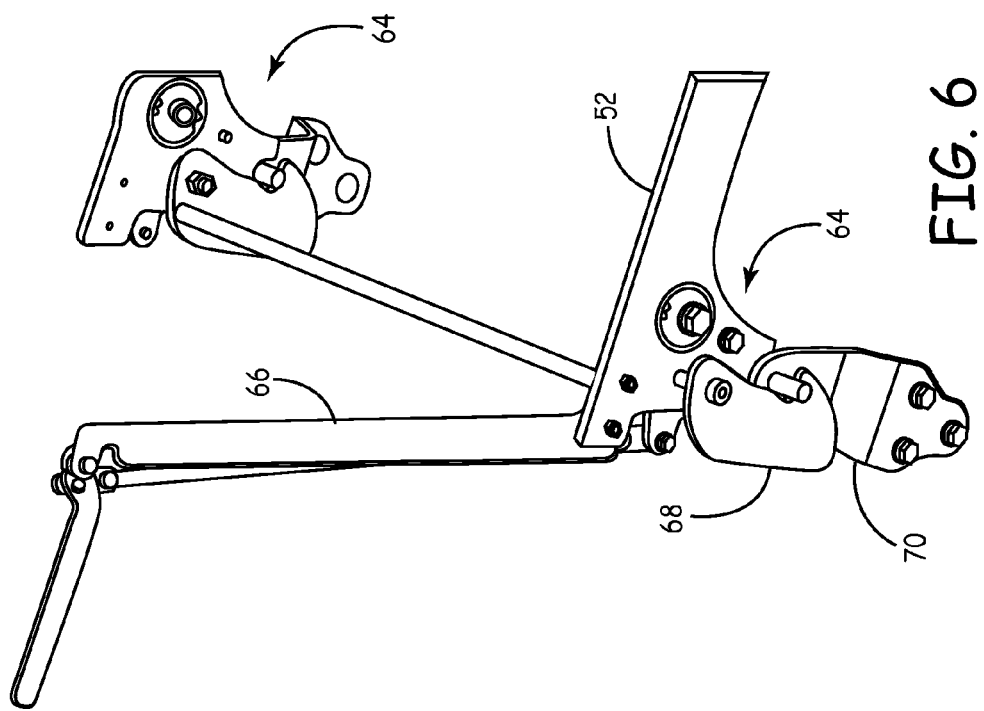

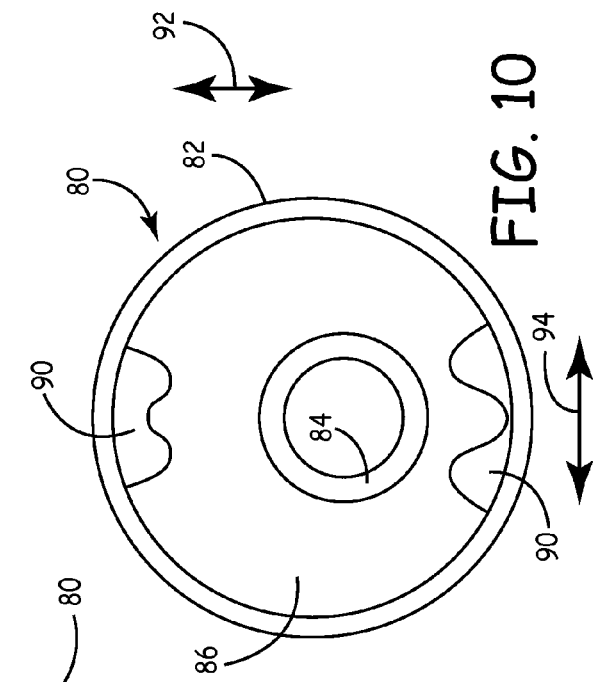
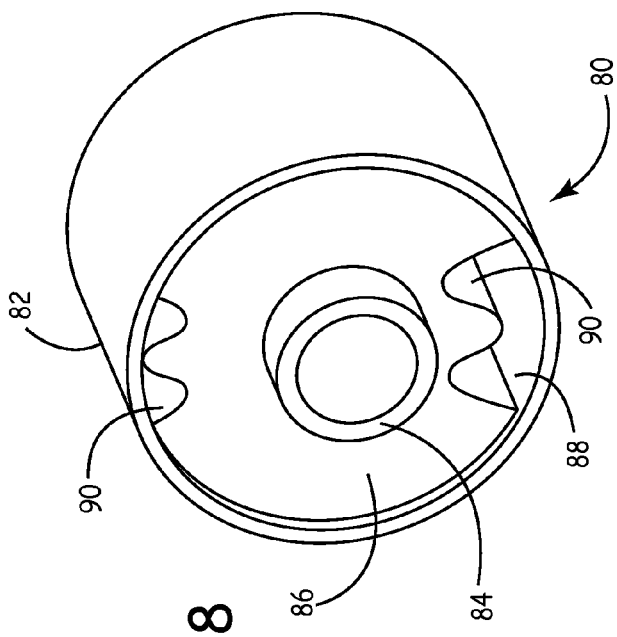
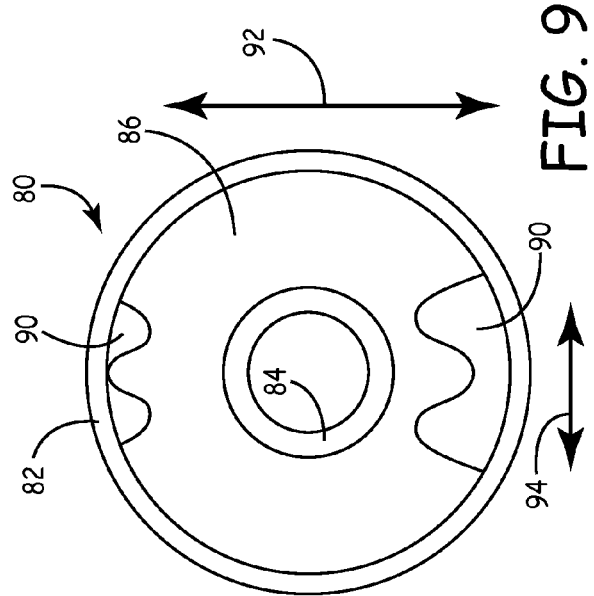

OPERATOR COMPARTMENT ASSEMBLY

FIELD OF THE INVENTION

The present invention relates to a pivotable operator compartment for a work machines. More particularly, the present invention relates to an operator compartment isolation mount.

BACKGROUND

Work machines such as skid steer loaders sometimes have an operator compartment that rotates or pivots for service access. A gas spring or mechanical spring provides lifting and rotating forces to facilitate pivoting the operator compartment. The spring force reacts against isolation mounts that are used to reduce vibration in the operator compartment, thereby reducing the spring's effectiveness.

SUMMARY

In one embodiment, the invention provides an operator compartment assembly for a work machine including an operator compartment and a cradle supporting operator compartment, the cradle being pivotable between an operating position and a service position. A biasing mechanism is coupled to the cradle for biasing the cradle toward the service position. An isolation mount couples the operator compartment to the cradle, the isolation mount having an axis of increased deflection aligned with a force exerted on the cradle by the operator compartment.

In another embodiment, the invention provides a work machine including a frame supported for movement over the ground, a prime mover for driving movement of the frame, an operator compartment supported on the frame and a cradle coupling the operator compartment to the frame. The cradle is pivotable between an operating position and a service position and includes a biasing mechanism for biasing the cradle toward the service position. An isolation mount couples the operator compartment to the cradle, the isolation mount having an axis of increased deflection aligned with a force exerted on the cradle by the operator compartment.

In another embodiment the invention provides a method of assembling a work machine including providing a frame, mounting a cradle to the frame, the cradle being pivotable between an operating position and a service position, biasing the cradle toward the service position and supporting an operator compartment on the cradle, the operator compartment being more deflectable relative to the cradle along a first axis than along a second axis perpendicular to the first axis, the first axis being aligned with a force exerted on the cradle by the operator compartment.

Other aspects of the invention will become apparent by consideration of the detailed description and accompanying drawings.

BRIEF DESCRIPTION OF THE DRAWINGS

FIG. 2 is a side view of an operator compartment assembly according to an embodiment of the invention.

FIG. 3 illustrates the operator compartment assembly of FIG. 2 in a service position.

FIG. 6 illustrates a latch mechanism in an engaged configuration according to an embodiment of the invention.

FIG. 7 illustrates the latch mechanism of FIG. 7 in a disengaged configuration.

FIG. 8 is a perspective view of an isolation mount according to an embodiment of the invention.

FIG. 9 is a front view of the isolation mount of FIG. 8.

FIG. 10 is a front view of the isolation mount of FIG. 8 loaded by the operator compartment and the operator.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
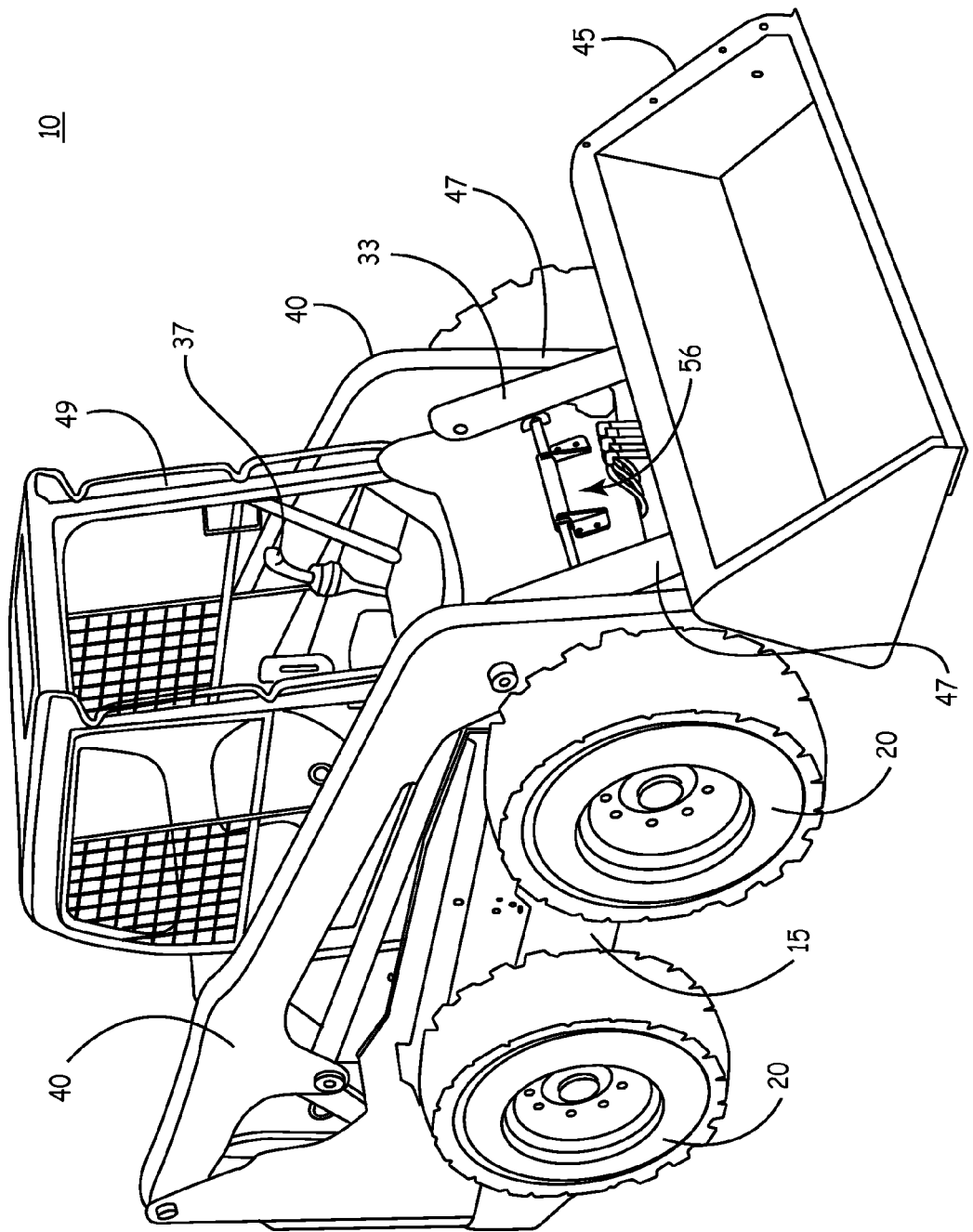
FIG. 1 is a perspective view of a work machine according to an embodiment of the invention.

FIG. 1 depicts a work machine 10 having a frame 15 supported by four wheels 20 for movement over the ground, an internal combustion engine 30 driving operation of a hydraulic system 33 and the wheels 20, an operator compartment assembly 35 that contains an operator control 37 (which is a joystick in the illustrated embodiment), a pair of lift arms 40, and a bucket 45 mounted for lifting and tilting at a distal end 47 of each lift arm 40. Although the invention is illustrated embodied in a skid steer utility vehicle 10, the invention may be embodied in other vehicles and machines, such as, for example, an all wheel steer loader or another type of compact construction vehicle. Although the illustrated operator control 37 takes the form of a joystick, in other embodiments, the control 37 may include a steering wheel and/or foot pedals. Although the illustrated prime mover for the work machine 10 is the internal combustion engine 30, other prime movers and sources of energy, including, but not limited to, fuel cells, solar energy, batteries, and corded electric motors, may be used in other embodiments.

Figure 4:
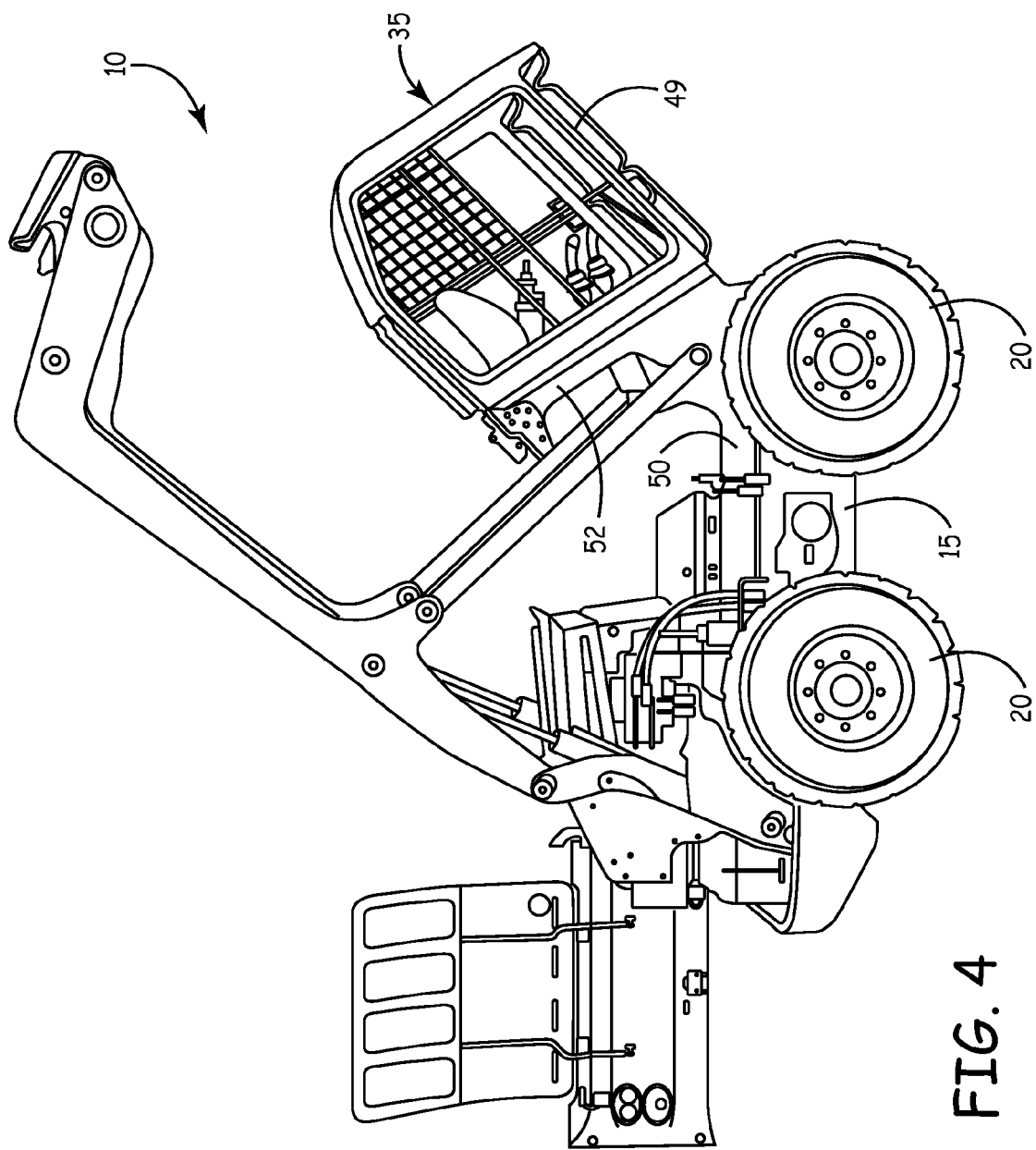
FIG. 4 is a side view of the work machine of FIG. 1 with the operator compartment assembly in the service position.
Figure 5:
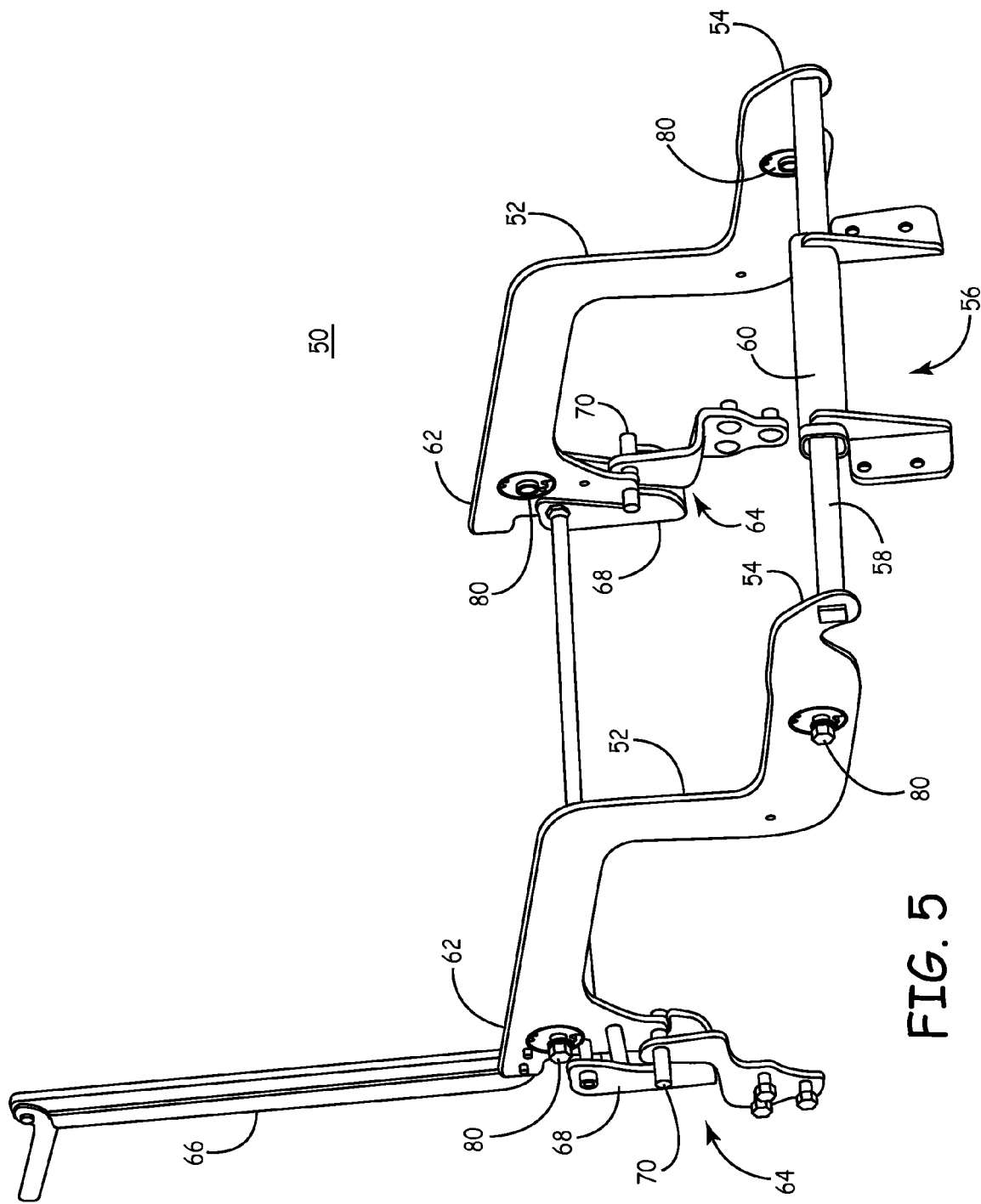
FIG. 5 illustrates an isometric view of a cradle according to an embodiment of the invention.

FIG. 2 depicts the operator compartment assembly 35. The operator compartment assembly 35 includes an operator compartment 49 supported on a cradle 50 that is pivotally mounted to the frame 15. The cradle 50 includes a pair of arms 52 each having a first or forward end 54 and a cross-support 58. The cross-support 58 can be coupled to the forward ends 54 of the cradle arms 52 or integrally formed with the cradle arms 52. The cross-support 58 is pivotally mounted to the frame 15 with a bracket 56. The cradle 50, and thus the operator compartment 49, is pivotal from a first or operating position as illustrated in FIGS. 1 and 2 to a second or service position as illustrated in FIGS. 3 and 4. In the service position, the portion of the work machine 10 below and/or obstructed by the operator compartment 49 is accessible for servicing.

A biasing mechanism 60 is provided on the forward end 54 of the cradle arms 52 for biasing the cradle 50 toward the service position. The biasing mechanism 60 opposes the weight of the operator compartment 35, facilitating pivoting of the operator compartment assembly 49 from the operating position to the service position. In the illustrated embodiment, the biasing mechanism 60 is a torsion spring incorporated into the mounting bracket 56. In other embodiments, the biasing mechanism 60 is a mechanical spring or gas spring, and can be coupled to the cross-support 58, the cradle arms 52, or a combination thereof.

A second or rearward end 62 of the cradle arms 52 are releasably couplable to the frame 15 with a pair of latch mechanisms 64. A handle 66 is operably coupled to the latch mechanisms 64 for actuating the latch mechanisms 64 to release the cradle 50 from the frame 15. In the illustrated embodiment, a single handle 66 is coupled to both latch mechanisms 64. An operator can therefore use one hand to release both latch mechanisms 64 at once. In other embodiments, the second ends 62 of the cradle arms 52 can be joined with a cross-support, and can be coupled by a single latch mechanism 64 to the frame 15, or separate handles can be provided for each latch mechanism 64.

In the illustrated embodiment, the latch mechanisms 64 include a hook-member 68 supported on the cradle arm 52 that is pivotable under the influence of the handle 66 and a pin 70 supported on the frame 15 for cooperating with the hook-member 68. FIG. 6 depicts the latch mechanism 64 in an engaged configuration while FIG. 7 depicts the handle 66 actuated to release the latch mechanism 64, disengaging the hook-member 68 from the pin 70. In other embodiments, the latch mechanism 64 can have other configurations.

The operator compartment 49 is mounted to each lift cradle arm 52 with one or more isolation mounts 80. FIGS. 8-10 depict the isolation mount 80 in greater detail. The isolation mounts 80 include a first portion 82 coupled to a second portion 84 with a deformable member 86. In the illustrated embodiment, the first portion 82 is mounted to the cradle arms 52 while the second portion 84 is mounted to the operator compartment 49. In other embodiments, this is reversed. The second portion 84 is movable or deflectable relative to the first portion 82 upon deformation of the deformable member 86. In this manner, vibrations of the cradle arms 52 and/or the frame 15 are muffled or isolated from the operator compartment 49, reducing vibrations in the operator compartment 49. The deformable member 86 can be formed of rubber, elastomer or other material that is deformable and/or energy absorbing.

In the illustrated embodiment, the first portion 82 is an outer cylinder and the second portion 84 is an inner cylinder disposed within the outer cylinder 82 to define an annular gap 88 between the first portion 82 and the second portion 84. The deformable member 86 is positioned in the gap 88 and is coupled to the first portion 82 and the second portion 84. The deformable member 86 can be adhered, bonded, frictionally engaged, clamped or mechanically coupled to the first and second portions 82, 84.

The deformable member 86 includes one or more voids 90. The voids 90 increase the deflectability or movement of the second portion 84 relative to the first portion 82 at the void 90. The voids 90 can be positioned so that the second portion 84 is more deflectable relative to the first portion 82 along a selected axis. In the illustrated embodiment, the isolation mount 80 includes an axis of greater deflection 92 and an axis of lesser deflection 94. The voids 90 can extend the length of the isolation mount 80, and in the illustrated embodiment, opposing pairs of voids 90 are provided to increase deflectability of the second portion 84 relative to the first portion 82 along the axis of greater deflection 92. In other embodiments, the voids 90 take the form of a region of material that is softer, more flexible or otherwise more deformable than the remainder of the deformable member 86. Thus, use of the term "void" refers not only to a region of empty space, but more generically to a region of the deformable member 86 having a reduced stiffness relative to the remainder of the deformable member 86.

The isolation mount 80 can be arranged so that the axis of greater deflection 92 is aligned with or approximately parallel to forces exerted on the cradle 50 under the influence of the operator's weight and of the weight of the operator compartment 49. FIG. 10 depicts the isolation mount 80 loaded with the operator compartment 49 and the operator. As illustrated, the deflection of the second portion 84 relative to the first portion 82 is greater along the axis 92 than it would be without the presence of the voids 90.

The isolation mount 80 isolates the forces exerted on the cradle arms 52 by the weight of the operator compartment 35 and the operator from biasing mechanism 60. In other words, the second portion 84 can deflect along the axis of greater deflection 92 under the influence of the operator compartment 35 and/or operator weight with a reduced transmission of force to the biasing mechanism 60. This helps to preserve the effectiveness of the biasing mechanism 60 despite stress on the isolation mounts 80 due to the weight of the operator compartment 35 and the operator.

The deformable member 86 can have a variety of profiles defining the shape of the void 90, and therefore the deflectability of the second portion 84 and the orientation of the axis of greater deflection 92. In the illustrated embodiment, each of the voids 90 has a cross-section generally in the shape of an "M" or "W". In other embodiments, the voids 90 can have a cross-section generally in the shape of a "U", a "C", a "V" or a combination thereof. In some embodiments, a first void 90 has a different size and/or shape than a second void 90.

Thus, the invention provides, among other things, an isolation mount for coupling an operator compartment to a cradle arm. Various features and advantages of the invention are set forth in the following claims.

What is claimed is:

1. An operator compartment assembly for a work machine, the operator compartment assembly comprising:
   an operator compartment;
   a cradle for supporting the operator compartment, the cradle being pivotable between an operating position and a service position;
   a biasing mechanism coupled to the cradle for biasing the cradle toward the service position; and
   an isolation mount coupling the operator compartment to the cradle, the isolation mount having an axis of increased deflection aligned with a force exerted on the cradle by the operator compartment.

2. The operator compartment assembly of claim 1, wherein the biasing mechanism is one of a torsion spring, a mechanical spring or a gas spring.

3. The operator compartment assembly of claim 1, wherein the isolation mount comprises a first portion mounted to the cradle and a second portion mounted to the operator compartment, wherein the second portion is supported for deflection relative to the first portion by a deformable member.

4. The operator compartment assembly of claim 3, wherein the second portion is deflectable relative to the first portion upon deformation of the deformable member.

5. The operator compartment assembly of claim 4, wherein the deformable member is formed of one of an elastomer or a rubber.

6. The operator compartment assembly of claim 4, wherein the deformable member includes voids sized and shaped to increase deflectability of the second portion relative to the first portion along the selected axis.

7. The operator compartment assembly of claim 1, further comprising a latch mechanism for coupling the cradle to the frame in the operating position.

8. The operator compartment assembly of claim 7, further comprising a handle for releasing the latch mechanism.

9. A work machine comprising:
   a frame supported for movement over the ground;
   a prime mover for driving movement of the frame;
   an operator compartment supported on the frame; and
   a cradle coupling the operator compartment to the frame, the cradle being pivotable between an operating position and a service position, the cradle including:
      a biasing mechanism for biasing the cradle toward the service position; and
      an isolation mount coupling the operator compartment to the cradle, the isolation mount having an axis of increased deflection aligned with a force exerted on the cradle by the operator compartment.

10. The work machine of claim 9, wherein the biasing mechanism is one of a torsion spring, a mechanical spring or a gas spring.

11. The work machine of claim 9, wherein the isolation mount comprises a first portion mounted to the cradle and a second portion mounted to the operator compartment, wherein the second portion is supported for deflection relative to the first portion by a deformable member.

12. The work machine of claim 11, wherein the second portion is deflectable relative to the first portion upon deformation of the deformable member.

13. The work machine of claim 11, wherein the deformable member is formed of one of an elastomer or a rubber.

14. The work machine of claim 11, wherein the deformable member includes voids sized and shaped to increase deflectability of the second portion relative to the first portion along the selected axis.

15. The work machine of claim 9, further comprising a latch mechanism for coupling the cradle to the frame in the operating position.

16. The work machine of claim 15, further comprising a handle for releasing the latch mechanism.

17. A method of assembling a work machine, the method comprising:
   providing a frame;
   mounting a cradle to the frame, the cradle being pivotable between an operating position and a service position;
   biasing the cradle toward the service position; and
   supporting an operator compartment on the cradle, the operator compartment being more deflectable relative to the cradle along a first axis than along a second axis that is perpendicular to the first axis, the first axis being parallel to a force exerted on the cradle by the operator compartment.

18. The method of claim 17 wherein mounting the operator compartment to the frame further comprises mounting a first portion of an isolation mount to the cradle and mounting a second portion of the isolation mount to the operator compartment, the second portion being supported for deflection on the first portion by a deformable member.

19. The method of claim 17, further comprising releasing the cradle for pivoting by disengaged a latch mechanism coupling the cradle to the frame.

\* \* \* \* \*

UNITED STATES PATENT AND TRADEMARK OFFICE
CERTIFICATE OF CORRECTION

| | | |
|---|---|---|
| PATENT NO. | : 7,946,370 B2 | Page 1 of 1 |
| APPLICATION NO. | : 12/405535 | |
| DATED | : May 24, 2011 | |
| INVENTOR(S) | : Larry E. Albright et al. | |

It is certified that error appears in the above-identified patent and that said Letters Patent is hereby corrected as shown below:

Column 6,
Line 29, claim 19, delete "disengaged" and insert --disengaging--.

Signed and Sealed this
Twenty-fifth Day of October, 2011

David J. Kappos
*Director of the United States Patent and Trademark Office*